July 1, 1930.  E. D. HAWK  1,768,906

STORAGE BATTERY

Filed July 6, 1928

INVENTOR

Ernest D. Hawk
by C. M. Clarke
atty.

Patented July 1, 1930

1,768,906

UNITED STATES PATENT OFFICE

ERNEST D. HAWK, OF NEW CASTLE, PENNSYLVANIA, ASSIGNOR TO HARRY B. WASSELL, TRUSTEE, OF PITTSBURGH, PENNSYLVANIA

STORAGE BATTERY

Application filed July 6, 1928. Serial No. 290,768.

My invention refers to an improvement in storage batteries, and particularly to a covering pad therefor as hereinafter described.

The purpose and object of the improvement is to provide a simple and efficient means for retaining the electrolyte within the cell at all times, while continuously preventing and retarding the escape of gas, or the possibility of flashing. While the construction of the pad is such as to not entirely prevent any passage of gas whatever, it is sufficiently porous to allow escape of surplus accumulation under slight pressure.

The invention is illustrated in connection with a standard or typical form of storage battery, as illustrated in the accompanying drawings, in which.

Figure 1:
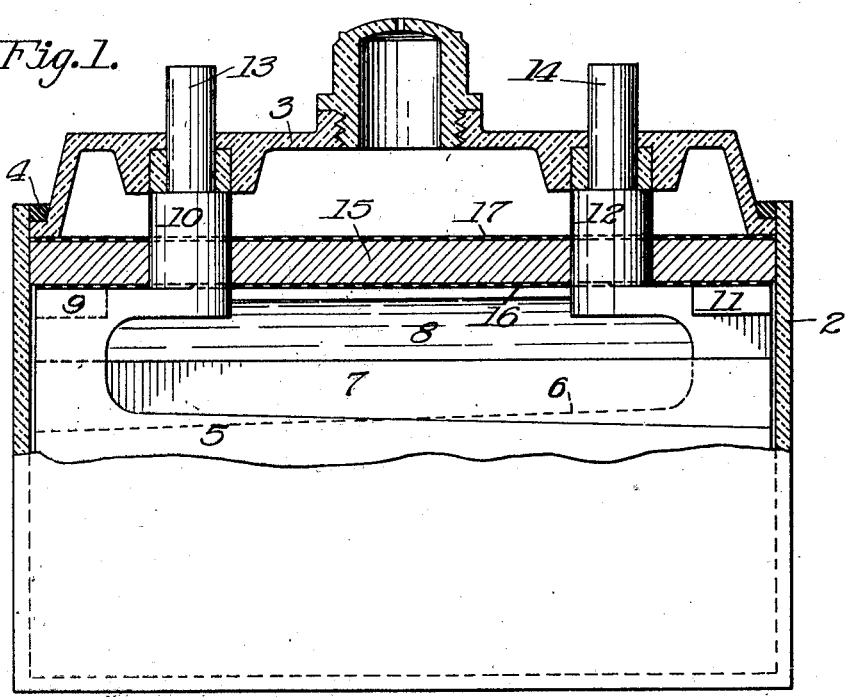
Fig. 1 is a sectional view in part elevation, showing the construction of the pad as applied.
Figure 2:
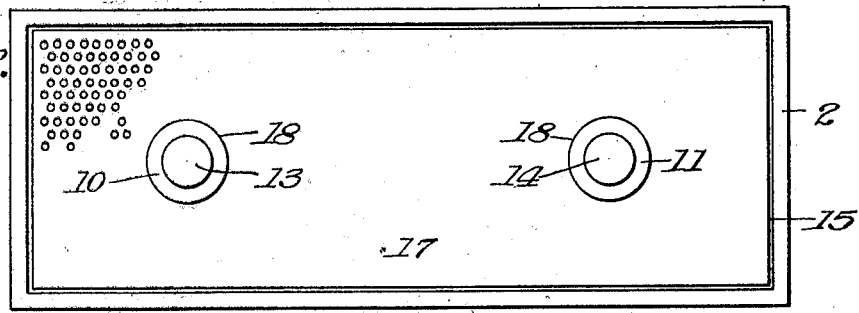
Fig. 2 is a plan view of Fig. 1, with the cover removed.
Figure 3:
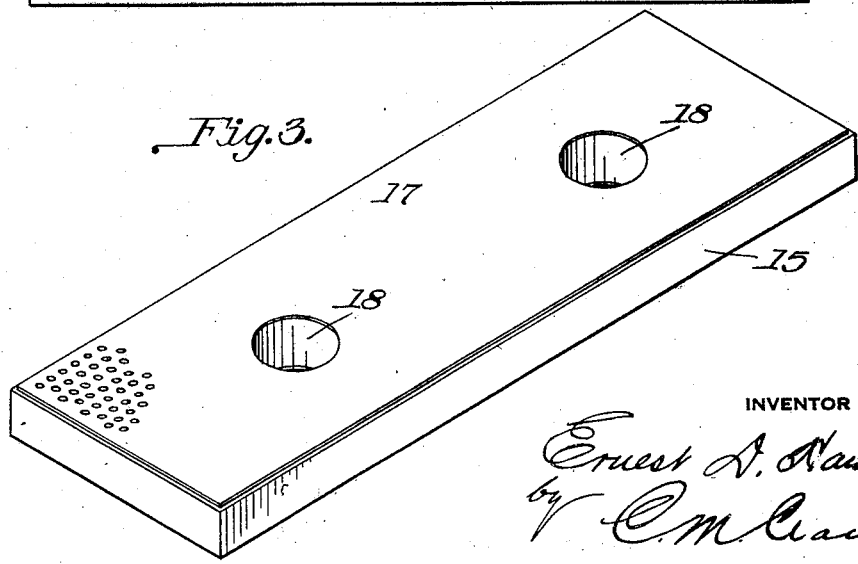
Fig. 3 is a perspective view of one of the improved pads, detached.

Referring to the drawings, 2 is the casing of the battery, of rectangular form and of suitable insulating material as hard rubber, for containing the usual battery elements and the electrolyte. The casing 2 is provided with a cover or top 3 of insulating material secured upon or inserted within the upper terminal edges of the casing, preferably with any suitable packing or sealing material 4, and having intervening clearance space and a filling opening, as shown.

The several plates 5 and 6 of opposite polarity are alternately placed within the casing with the usual intervening spacers 7, and immersed in the usual body of liquid electrolyte 8. Plates 5 are connected by the usual bridge 9 with post 10, and plates 6 by bridge 11 with post 12. The posts as shown project upwardly through suitable openings in the cover 3, and are provided with the usual connecting terminals 13—14, for circuit connection with the conductor terminals or across to an adjacent cell in the usual manner, as will be readily understood.

The pad, forming the novel feature of the present invention, consists of a flat rectangular body portion 15, at each side of which is a lower and upper confining plate 16 and 17 respectively, of perforated rubber or other suitable material.

The composition of the pad member 15 is of a mixture of burnt kieselguhr, French chalk, and a dilute solution of sulphuric acid. The mixture of the first and second elements is in the proportion of about two parts by weight of kieselguhr, to one part of French chalk, which are comminuted or pulverized, thoroughly mixed together, and then invested with dilute sulphuric acid of approximately 1.150 specific gravity just sufficiently to form a thick paste, about the consistency of putty.

The mixture as thus made is then formed into the pad form in a suitable mold, under pressure, whereby to shape it into the desired dimensions for easy insertion and removal within the upper portion of the casing. Thereafter, the perforated plates 16 and 17 are applied to opposite sides and compressed into the pad by sufficient pressure so as to amalgamate the three several parts together whereby to form a unitary properly shaped and dimensioned pad. The body 15 being somewhat plastic and extending slightly beyond the edges of plates 16—17 makes a sealing fit within the walls of the casing when inserted.

The pad and its perforated plates are provided with two transverse perforations 18, properly located, and of dimensions to neatly fit over the posts 10 and 12, and with an approximate tight binding fit within the upper walls of the casing. As thus made and applied the entire pad may be easily inserted or removed, if it is desired to make repairs or to replace plates or other parts.

The combination with the kieselguhr and French chalk, of the dilute sulphuric acid, effects a desirable reaction, rendering the pad sufficiently resistant to passage of fluid or of ordinary gas escape, at the same time entirely preventing sparking of the electrolyte in action. The reaction of the invested sulphuric on the kieselguhr and French chalk is to solidify and harden the pad similar to that which occurs when the plate oxides are mixed with acid. It is therefore desirable to completely form the acid invested pad before placing it in position in the battery cell.

What I claim is:

1. In storage battery construction, a casing, a series of battery plates mounted therein, a cover, and a covering pad composed of finely comminuted kieselguhr and French chalk saturated with an acid and provided with tightly compressing upper and lower perforated plates in holding engagement with the pad, said pad and its plates being located between the top of the battery plates and the cover.

2. In storage battery construction, a casing, a series of battery plates mounted therein, a cover, and a covering pad composed of comminuted kieselguhr and French chalk saturated with dilute sulphuric acid and provided with tightly compressing upper and lower perforated plates tightly engaging the pad and located between the top of the battery plates and the cover.

3. A retaining pad for storage batteries consisting of a body composed of mixed kieselguhr and French chalk invested with a dilute solution of sulphuric acid and having outer confining plates of perforated material tightly compressing the opposite sides of the pad and firmly invested therewith by interlocking engagement with the plate perforations.

4. A retaining pad for storage batteries consisting of a body composed of a mixture of about two parts of finely comminuted kieselguhr and about one part of finely comminuted French chalk invested with a dilute solution of sulphuric acid and having outer confining plates of perforated material pressed into its upper and lower faces.

In testimony whereof I hereunto affix my signature.

ERNEST D. HAWK.